(No Model.) 2 Sheets—Sheet 2.
J. M. COULTER.
STEAM FRUIT DRIER.
No. 530,506. Patented Dec. 11, 1894.
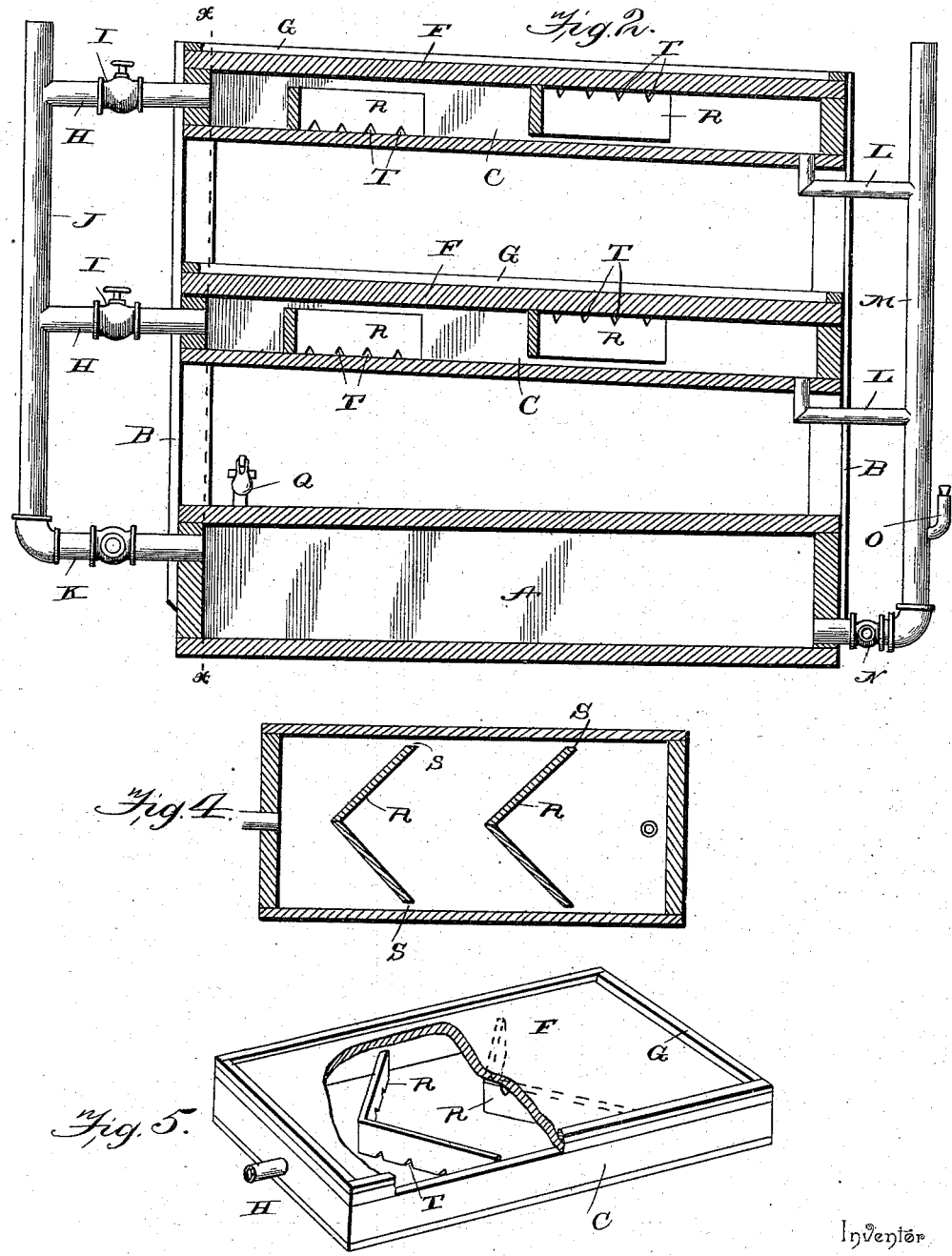
Witnesses
John C. Shaw
D. P. Kochauspha
Inventor
Joseph M. Coulter
By his Attorneys.
C. A. Snow & Co.

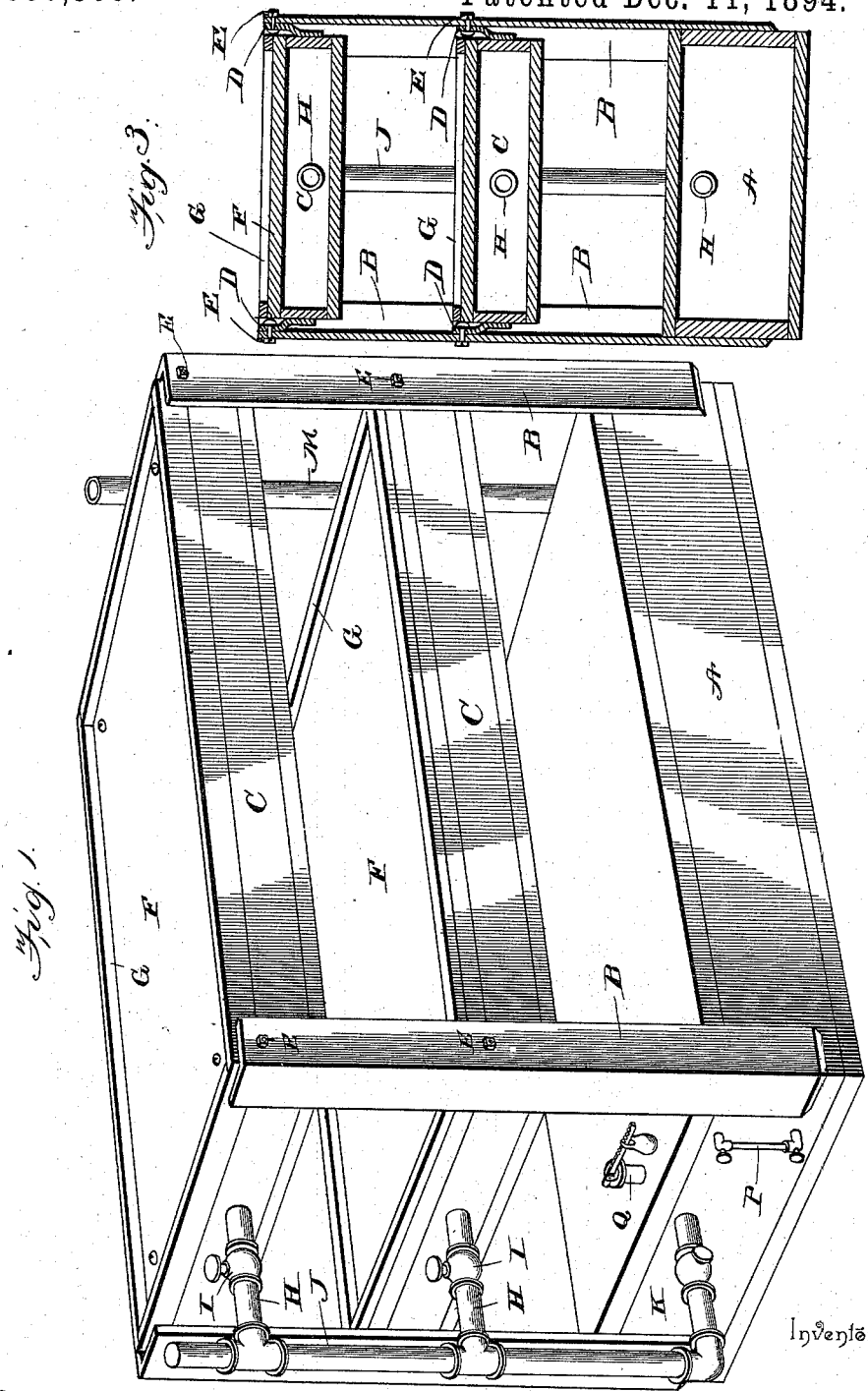

UNITED STATES PATENT OFFICE.

JOSEPH M. COULTER, OF PORTLAND, OREGON.

STEAM FRUIT-DRIER.

SPECIFICATION forming part of Letters Patent No. 530,506, dated December 11, 1894.

Application filed June 13, 1893. Serial No. 477,446. (No model.)

*To all whom it may concern:*

Be it known that I, JOSEPH M. COULTER, a citizen of the United States, residing at Portland, in the county of Multnomah and State of Oregon, have invented a new and useful Steam Fruit-Drier, of which the following is a specification.

This invention relates to fruit driers; and it has for its object to provide certain improvements in that class of fruit driers in which steam is used as the drying agent.

To this end the main and primary object of the present invention is to construct a fruit drier in which a thorough circulation of air is constantly about the fruit being dried, while at the same time the heat is evenly distributed to all portions of the fruit in order to insure quick and thorough drying thereof, and at the same time providing means whereby the heat can be regulated separately for any portion of the driers.

With these and other objects in view which will readily appear as the nature of the invention is better understood, the same consists in the novel construction, combination and arrangement of parts hereinafter more fully described, illustrated and claimed.

In the accompanying drawings:—Figure 1 is a perspective view of a steam fruit drier constructed in accordance with this invention. Fig. 2 is a central vertical longitudinal sectional view thereof. Fig. 3 is a central vertical sectional view on the line $x$—$x$ of Fig. 2. Fig. 4 is a horizontal sectional view through one of the rectangular steam pans. Fig. 5 is a perspective view of one of the steam pans the top tray portion being partially broken away to expose the interior of the pan.

Referring to the accompanying drawings, A represents the steam boiler constructed in any suitable shape and of any suitable material, but is preferably constructed in a rectangular shape as illustrated, and is adapted to be heated in the ordinary manner, whereby steam will be generated from the water therein and circulated throughout the various parts of the drier.

Secured to each of the corners of the lower boiler A, are the corner frame uprights B. The corner frame uprights B, are angular in cross section, and are adapted to removably receive and support in position the series of horizontally inclined steam pans C, arranged one above the other and above the bottom boiler, allowing a free circulation of air entirely around the same. The corners of the steam pans C loosely register in the angle frame uprights B, and are provided at such points with the off-standing perforated attachment lugs D, which receive the securing bolts E, passing therethrough and through the uprights B, thereby providing an attachment of the several steam pans to the frame uprights, whereby each pan can be removed from the frame separately and independently of any of the other pans, and also providing means so that any number of pans may be separately placed in position above the lower boiler.

The use of the perforated off-standing attachment lugs G, not only avoids the use of bolts or screws which pass directly through the frame uprights and also the steam pans, which is not desirable, but such lugs also support the corners of the pans out of contact with the frame uprights, in which they loosely register, so that a sufficient space is left for the convenient removal or positioning of each pan separately and independently of the other.

By reason of supporting the corners of the pans within the angle of the frame uprights and out of contact therewith, with the lugs D, means are not only provided whereby the pans are made separately and independently removable, but air circulating spaces are left at the corners of the pans to provide for a more complete circulation than would otherwise be secured.

The steam pans C, are constructed of suitable metal and are hollow throughout their entire length to permit of a free circulation of steam within the same, and, as illustrated, are provided with the removable tray tops F, having the surrounding edge flanges G, thereby completing a fruit tray in which the fruit to be dried can be placed, and also secure the benefit of the circulation of steam throughout the interior of the pans which are inclosed by such tray tops.

The several steam pans are all arranged parallel with each other and at an inclination to provide a drain for condensed steam from the lower end thereof, and to the higher ends of each of the steam pans is connected a steam supply branch pipe H, provided with a valve I, and connected to the common steam supply pipe J, arranged at one end of the drier.

The common steam supply pipe J, is provided with a lower valved connection K, connected to one end of the boiler A, near its top, and by reason of the valved pipe J, and the several valved branches H, the quantity of steam admitted to any one of the steam pans can be easily and accurately regulated.

To the lower ends of the horizontal inclined steam pans C, are connected the branch pipes L, which not only serve to carry off or drain the water of condensation from the steam pans, but at the same time to provide for the exhaust of the steam therefrom, and are connected at their outer extremities to the combined exhaust and drain pipe M, arranged vertically at one end of the drier opposite to the pipe J. The combined vertical drain and exhaust pipe M, is open at its upper end to allow for the escape of the exhaust steam, and is provided at its lower end with a valved branch connection N, connected to the bottom of the boiler at one end, and thereby allowing the drained water to pass back into the boiler, and also providing a connection which acts in the capacity of a blow-off for said boiler.

A filling pipe O, is connected to one side of the pipe M, and provides means for filling the boiler with water, and the height of the water in the boiler is indicated by an ordinary water gage P, connected with one end of the same, while undue pressure of steam in the boiler is relieved by an ordinary safety valve Q, connected with the top thereof.

In order to provide for the even distribution of the circulating steam throughout the entire interior area of the steam pans C, I employ separate V-shaped steam distributing or spreading strips R. The V-shaped distributing or spreading strips R, are arranged transversely inside of each steam pan and terminate short of the sides thereof to form side steam passages S, and the same have their apices disposed toward the pipe connections H, therewith, so that the incoming steam is deflected or spread out toward the sides of the steam pans, as well as over and under the strips R, and is thereby thoroughly and evenly distributed within the steam pans to secure a uniform heating thereof, and thereby insure a uniform drying of the fruit placed on top of the pans. As clearly illustrated in the drawings the V-shaped distributing or spreading strips R, are provided at one edge with the steam openings or notches T, so that the steam can readily pass over and under the strips, and such strips have their notched edges reversely disposed to each other, by means of which disposition the more complete circulation of the steam is effected.

From the foregoing it is thought that the construction operation and many advantages of the herein described steam fruit drier will be readily apparent to those skilled in the art.

Having thus described the invention, what is claimed, and desired to be secured by Letters Patent, is—

In a steam fruit drier, the combination with the boiler, the hollow steam pans arranged one above the other, and the steam circulating pipe connections; of separate V-shaped steam distributing or spreading strips arranged transversely inside of each steam pan, and having their opposite ends terminating short of the sides of the pans to leave side steam passages, said strips also having their apices disposed toward the steam inlet or supply of each pan and provided in one edge with steam openings or notches, the notched edges of the strips being reversely disposed to each other substantially as set forth.

In testimony that I claim the foregoing as my own I have hereto affixed my signature in the presence of two witnesses.

JOSEPH M. COULTER.

Witnesses:
ELI MORRILL,
ORLANDO H. STOTT.